United States Patent [19]

Stavitsky et al.

[11] Patent Number: 4,462,780
[45] Date of Patent: Jul. 31, 1984

[54] INJECTION MOLDING APPARATUS

[75] Inventors: David Stavitsky, Plainsboro; Ernest A. Beres, Robbinsville, both of N.J.

[73] Assignee: RCA Corporation, New York, N.Y.

[21] Appl. No.: 450,770

[22] Filed: Dec. 17, 1982

[51] Int. Cl.³ .............................................. B29F 1/00
[52] U.S. Cl. .................................. 425/144; 425/143; 425/547; 425/407; 425/810; 264/106
[58] Field of Search ............... 264/106; 425/143, 144, 425/407, 547, 810, 190, 191, 192 R

[56] References Cited

U.S. PATENT DOCUMENTS

| | | | |
|---|---|---|---|
| 1,582,704 | 4/1926 | Sylvester et al. | 425/407 |
| 3,830,459 | 8/1974 | Strausfeld | 249/79 |
| 3,941,547 | 3/1976 | Hunyar et al. | 425/407 |
| 4,085,178 | 4/1978 | McNeely et al. | 264/106 |
| 4,141,531 | 2/1979 | Strausfeld | 249/80 |
| 4,260,360 | 4/1981 | Holmes et al. | 425/810 |
| 4,340,353 | 7/1982 | Mayer | 264/106 |
| 4,344,142 | 8/1982 | Diehr et al. | 425/144 |
| 4,354,812 | 10/1982 | Wieder et al. | 425/144 |
| 4,391,579 | 7/1983 | Morrison | 425/810 |

OTHER PUBLICATIONS

Patent Application of D. Stavitsky et al., Ser. No. 418,809, filed Sep. 16, 1982, entitled Mold for Recorded Disc.

Primary Examiner—Donald E. Czaja
Assistant Examiner—V. Fischbach
Attorney, Agent, or Firm—Birgit E. Morris; Donald S. Cohen

[57] ABSTRACT

An apparatus for injection molding an article includes a pair of mold members, at least one of which is movable toward and away from the other. Each mold member includes a base plate, a manifold plate and a cover plate. Each base plate has inner and outer surfaces with a mold cavity in its inner surface and an annular recess in its outer surface. A plurality of connected grooves is in the bottom of the recess to form a channel. The manifold plate is an annular plate which is seated in the recess in its respective base plate. The manifold plate has inlet and outlet passages which extend to separate ones of the grooves in the base plate. The cover plate extends across the outer surface of the base plate and the manifold plate to hold the manifold plate in the recess. One of the base plates has a hole therethrough from its outer surface to its mold cavity to allow the flow of molding material into the mold cavity.

10 Claims, 2 Drawing Figures

INJECTION MOLDING APPARATUS

BACKGROUND OF THE INVENTION

The present invention relates to an injection molding apparatus and more particularly to an injection molding apparatus having means for providing better control of the temperature of the mold cavity.

Injection molding apparatus in general includes a pair of mold plates, at least one of which is movable toward and away from the other, each having a mold cavity in its surface which opposes the other member. Each of the mold cavities is usually of a size and shape corresponding to the size and shape of one half the article being molded. One of the mold members has a passage therethrough to its mold cavity through which the molding material is injected into the mold cavities. During the molding of an article in an injection molding apparatus, controlling the temperature of the mold numbers, both during heating and cooling, is an important part of the molding operation. During the injection of the molding material into the mold cavity, the temperature must be controlled to ensure complete filling of the mold cavity so as to obtain a molded article having the desired dimensions. This is particularly important when molding an article which is relatively large in diameter but also relatively thin. Also, good temperature control is desirable during the cooling of the molded article to maintain the desired dimensions of the article as a result of any contraction of the molding material and to prevent non-uniform stresses being formed in the article which could cause warping of the article. Therefore, it is desirable to have a molding apparatus which provides for control of the temperature of the apparatus during the various stages of the molding process.

SUMMARY OF THE INVENTION

An apparatus for injection molding an article includes a pair of mold plates, at least one of which is movable toward and away from the other. Each of said mold members includes a base having inner and outer surfaces with the inner surfaces of the base plates facing each other. The inner surfaces of the base plates contain mating mold cavities. A channel is in the outer surface of each base plate and is adapted to receive a flow of a temperature control medium. A separate manifold plate is mounted on the outer surface of each of the base plates with each of the manifold plates having inlet and outlet passages extending therethrough and connected to the channel in its respective base plate. Means is provided for holding each of the manifold plates against its respective base plate but allowing relative lateral movement between the manifold plate and base plate.

DETAILED DESCRIPTION OF PREFERRED EMBODIMENT

Figure 1:
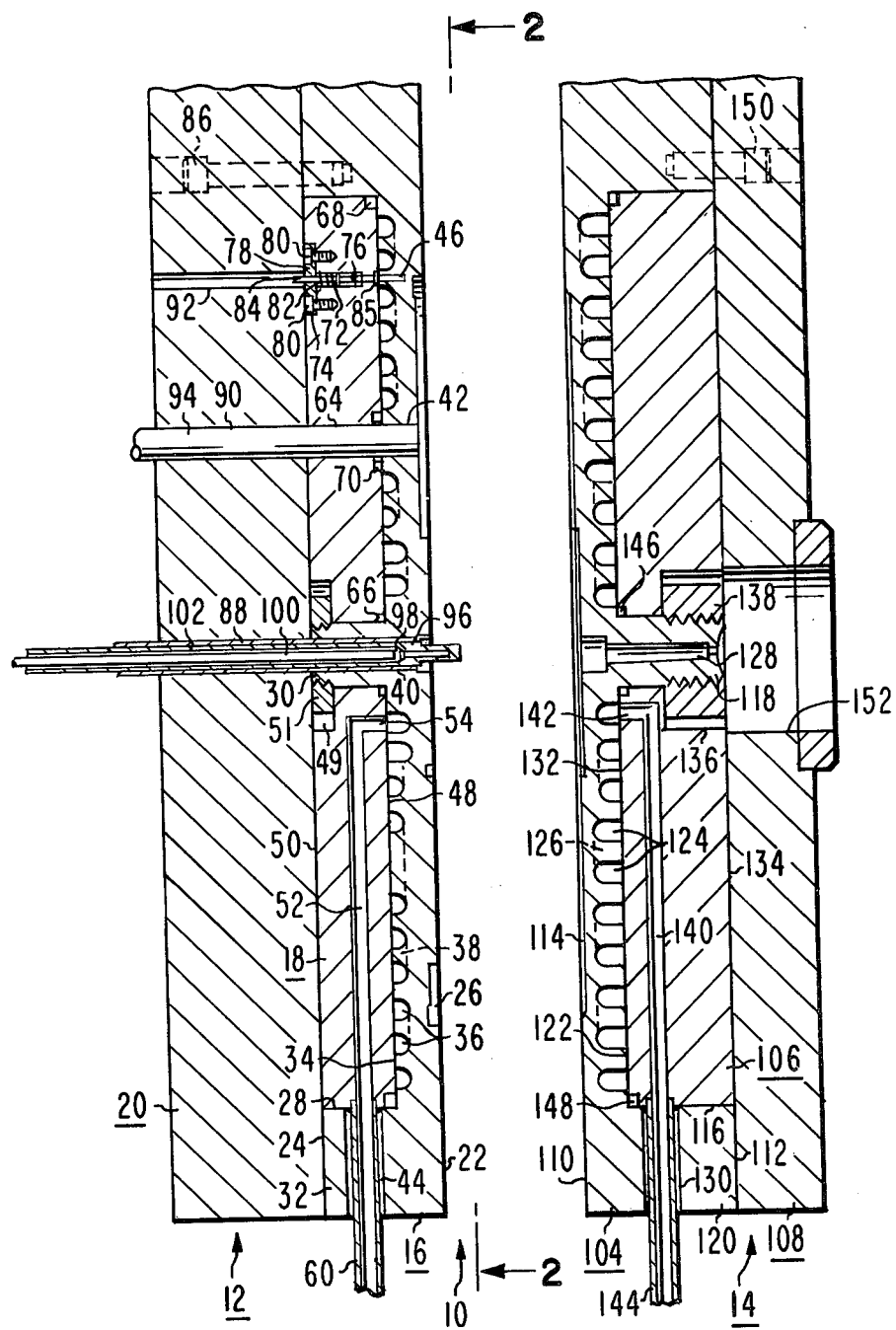
FIG. 1 is a sectional view of a molding apparatus which incorporates the present invention.
Figure 2:
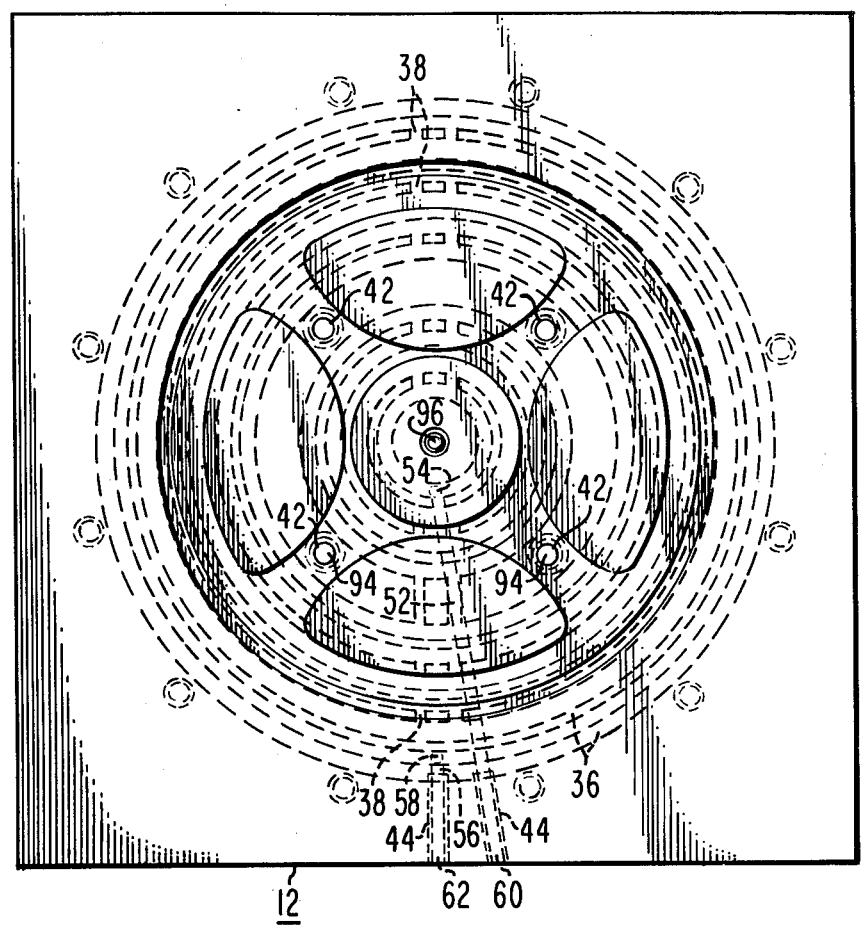
FIG. 2 is a plan view of the inner surface of one of the mold members taken along line 2—2 of FIG. 1.

Referring to the drawings, the preferred embodiment of a molding apparatus incorporating the present invention is generally designated as 10. The molding apparatus 10 includes a pair of opposed mold members 12 and 14 which are mounted in a mold press so that at least one of the mold members is movable toward and away from the other mold member. In the preferred embodiment the mold member 14 is fixed and the mold member 12 is movable. The movable mold member 12 includes a base plate 16, a manifold plate 18, and a cover plate 20. The base plate 16 has opposed inner and outer surfaces 22 and 24, respectively. The inner surface 22 has a mold cavity 26 therein of a size and shape corresponding to a portion of the article to be molded. The outer surface 24 has an annular recess 28 therein which provides the base plate 16 with a central cylindrical hub 30 and an outer cylindrical rim 32. The bottom surface 34 of the recess 28 has a plurality of concentric, radially spaced, circular grooves 36 therein. Radially extending grooves 38 (see FIG. 2) in the bottom surface 34 of the recess 28 extend between adjacent annular grooves 36 so that the annular grooves 36 are connected to form a channel through which a heat control medium can flow. A hole 40 extends through the center of the hub 30 from the outer surface 24 to the mold cavity 26. Four holes 42 extend through the base plate 16 from the bottom surface 34 of the recess 28 to the mold cavity 26 and are arranged around a circle located between two of the annular grooves 36. Two passages 44 extend radially through the rim 32 from the recess 28 to the outer periphery of the base plate 16 with the passages 44 being adjacent but slightly spaced from each other. A hole 46 extends into the base plate 16 from the bottom surface 34 of the recess 28 between two of the grooves 36 adjacent the rim 32.

The manifold plate 18 is an annular plate having substantially flat inner and outer surfaces 48 and 50, respectively. The manifold plate 18 is of a thickness equal to the depth of the recess 28 in the base plate 16, has an inner diameter slightly larger than the outer diameter of the hub 30, and an outer diameter slightly smaller than the inner diameter of the rim 32. Thus, the manifold plate 18 fits within the recess 28 with the ability to move slightly laterally in the recess 28. The outer surface 50 of the manifold plate 18 has an annular recess 49 around its inner circumference. The recess 49 receives a nut 51 which is threaded around the hub 30 to hold the manifold plate 18 in the recess in the base plate 12. An inlet passage 52 extends through the manifold plate 18 from its outer periphery to a riser passage 54 which extends to the inner surface 48 at the innermost one of the circular grooves 36 in the bottom surface 34 of the recess 28. An outlet passage 56 (see FIG. 2) extends through the manifold plate 18 from its outer periphery to a riser passage 58 which extends to the inner surface 48 of the manifold plate 18 at the outermost groove 36. The inlet and outlet passages 52 and 56 open at the outer periphery of the manifold plate 18 in alignment with the radial passages 46 in the rim 36. Inlet and outlet tubes 60 and 62 are secured in the ends of the inlet and outlet passages 52 and 56, respectively, and extend through the radial passages 56 where they are connected to a source of a temperature control medium. The manifold plate 18 has four holes 64 therethrough which are in alignment with the holes 42 in the base plate 16. Annular sealing rings 66 and 68 are provided between the inner surface 48 of the manifold plate 18 and the bottom 34 of the recess 28 at the inner and outer edges of the manifold plate 18. A sealing ring 70 is provided between the inner surface 48 of the manifold plate 18 and the bottom surface 34 of the recess 28 around each of the holes 64.

A hole 72 extends through the manifold plate 18 in alignment with the hole 46 in the base plate 16. A recess 74 is in the outer surface 50 of the manifold plate 18 and extends across the hole 72. A thermocouple 76 is in the hole 72 and extends into the hole 46. A cover 78 is in the recess 74 and is secured therein by screws 80. A helical spring 82 is in the hole 72 and is compressed between the cover 78 and the thermocouple 76 to hold the thermocouple in place. The wires 84 of the thermocouple extend from the hole 72 through a hole in the cover 78. A sealing ring 85 extends around the thermocouple 76 at the inner surface 48 of the manifold plate 18.

The cover plate 20 is a flat plate which extends across and contacts the outer surfaces 24 and 50 of the base plate 16 and manifold plate 18, respectively. The cover plate 20 is secured to the base plate 16 by bolts 86 which extend through the cover plate 20 and are threaded in the rim 32 of the base plate 16. Thus, the cover plate 20 also holds the manifold plate 18 within the recess 28 but allows relative lateral movement between the manifold plate 18 and the base plate 16. The cover plate 20 has a central hole 88 therethrough which is in alignment with the hole 40 in the base 16. The cover plate 20 also has four holes 90 therethrough which are in alignment with the holes 64 in the manifold plate 18 and the holes 42 in the base plate 16. A hole 92 extends through the cover plate 20 and receives the wires 84 of the thermocouple 76.

A separate knockout pin 94 is in each set of aligned holes 42, 64 and 90 in the base plate 16, manifold plate 18 and cover plate 20, respectively. The knockout pins 94 extend to the cavity 26 so as to permit the knockout pins to force the completely molded article from the mold cavity 26 at the appropriate time in the molding cycle. A core pin 96 is fixedly mounted in the aligned center holes 40 and 88 and extends into the mold cavity 26 to form a hole in the article to be molded. The core pin 96 has a passage 98 extending longitudinally therethrough to its inner closed end. A tube 100 is within the passage 98 and feeds a cooling medium, such as a gas or liquid, into the passage 98 to cool the core pin 96. A knockout sleeve 102 is slidably mounted within the aligned center holes 40 and 88 and surrounds the core pin 96. The knockout sleeve 102 extends to the mold cavity 26 and is adapted to help knock out the completely molded article from the mold cavity at the appropriate time during the mold cycle.

The fixed mold member 14, like the movable mold member 12, includes a base plate 104, a manifold plate 106 and a cover plate 108. The base plate 104 is similar to the base plate 16 in that it has opposed inner and outer surfaces 110 and 112 with a mold cavity 114 in the inner surface 110 which mates with the mold cavity 26 to form an overall mold cavity of the size and shape of the article to be molded. The outer surface 112 has an annular recess 116 therein which provides the base plate 104 with a central cylindrical hub 118 and an outer cylindrical rim 120. The bottom surface 122 of the recess 116 has a plurality of concentric, radially spaced, circular grooves 124 therein. The circular grooves 124 are connected by radially extending grooves 126 in the bottom surface 122 to form a channel through which a temperature control medium can flow. A sprue hole 128 extends through the center of the hub 118 to the mold cavity 114 to permit the injection of the molding material into the mold cavity. Two passages 130 extend radially through the rim 120 from the recess 116 to the outer periphery of the base plate 104 with the passages 130 being adjacent but slightly spaced from each other. Thus, the base plate 104 is of the same structure as the base plate 16 except that it does not include holes for knockout pins or thermocouples and the hole in the hub is a sprue hole rather than for a core pin.

The manifold plate 106 is of the same structure as the manifold plate 18 in that it is an annular plate having flat inner and outer surfaces 132 and 134 and it is of a size to fit in the recess 116 with some lateral movement. The outer surface 134 of the manifold plate 106 has an annular recess 136 therein around its inner circumference. The recess 136 receives a nut 138 which is threaded around the hub 118 to hold the manifold plate 106 in the recess 116 in the base plate 104. An inlet passage 140 extends through the manifold plate 106 from its outer periphery to a riser passage 142 which extends to the inner surface 132 at the innermost one of the circular grooves 124 in the bottom surface 122 of the recess 116. Like the manifold plate 18, the manifold plate 106 also has an outlet passage (not shown) extending therethrough from its outer periphery to a riser passage which extends to the inner surface 132 at the outermost groove 124. The inlet passage 140 and the outlet passage open at the periphery of the manifold plate 106 in alignment with the radial passages 130 in the rim 120. An inlet tube 144 is secured in the end of the inlet passage 140 and an outlet tube (not shown) is secured at the end of the outlet passage. The inlet tube 144 and the outlet tube extend through the radial passages 130 where they are connected to a source of a temperature control medium. Annular sealing rings 146 and 148 are provided between the inner surface 132 of the manifold plate 106 and the bottom 122 of the recess 116 at the inner and outer edges of the manifold plate 106. Thus, the manifold plate 106 is of the same structure as the manifold plate 18 except that it does not have the holes for the knockout pins and the thermocouple.

The cover plate 108 is a flat plate which extends across and contacts the outer surfaces 112 and 134 of the base plate 104 and manifold plate 106, respectively. The cover plate 108 is secured to the base plate 104 by bolts 150 which extend through the cover plate 108 and are threaded into the rim 120 of the base plate 104. Thus, the cover plate 108 also holds the manifold plate 106 within the recess 116 but allows relative lateral movement between the manifold plate 106 and the base plate 104. The cover plate 108 has a central hole 152 therethrough which is in alignment with the sprue hole 128 and is adapted to receive the nozzle of an extruder for admitting the mold material into the sprue hole 128.

In the operation of the molding apparatus 10, the movable mold member 12 is moved against the fixed mold member 14 to the closed position of the molding apparatus 10 where the mold members 12 and 14 engage each other and the mold cavities 26 and 114 mate to form the overall mold cavity. The molding material is then injected through the sprue hole 128 into the mating mold cavities 26 and 114 until they are completely filled with the molding material. The mold members 12 and 14 are then cooled to cool and harden the molding material. When the molding material is sufficiently hardened, the movable mold member 12 is moved away from the fixed mold member 14 to open the molding apparatus 10. The knockout pins 94 and knockout sleeve 102 are then actuated to engage the molded article in the mold cavity 126 and force the molded article from the mold cavity 26.

During the molding operation a temperature control medium is caused to flow through the grooves 36 and 124 in the base plates 16 and 104, respectively. The temperature control medium is provided to provide an appropriate temperature for the mold cavities 26 and 114 during the various portions of the molding cycle. For example, prior to injecting the molding material into the mold cavities 26 and 114, a heated temperature control medium, such as steam or hot water, can be passed through the grooves 36 and 124 to heat the mold cavities 26 and 114. This will prevent any hardening of the molding material as it enters the mating mold cavities 26 and 114 so as to achieve a complete filling of the mating mold cavities.

After the mating mold cavities are completely filled with the molding material, the flow of the heated temperature control medium is stopped and a cooler temperature control medium, such as tap water, is flowed through the grooves 36 and 124. This will cool the mold cavities 26 and 114 so as to harden the molding material within the mold cavities. Since the grooves 36 and 124 extend across the entire diameter of the mating mold cavities, the cooler temperature control medium will provide a uniform cooling of the molding material so as to prevent or minimize non-uniform stressing of the molded article as it is hardened. Thus, the use of a temperature control medium will provide for more uniform and complete filling of the mating mold cavities and for faster hardening of the molding material with the achievement of more uniform stressing of the completed article.

Instead of using two separate temperature control media, a single temperature control medium can be passed through the mold members during the entire molding cycle. The single temperature control medium can be at a temperature above the room temperature but below the melting temperature of the molding material. For example, when using a thermoplastic molding material which is extruded into the mold cavity at a temperature of about 450° F., the temperature control medium can be a fluid at a temperature of between 160° F. and 200° F. The single temperature control medium will keep the mold cavities at a uniform temperature to allow for complete filling of the mold cavities. After the injection of the molding material into the mold cavities is completed, the temperature control medium will assist in the uniform cooling of the molded article.

The thermocouple 76 measures the temperature of the base plate 16 adjacent the mold cavity 26 so as to provide an indication of the temperature of the mold cavity. The output of the thermocouple 76 can be used to control the temperature and flowrate of the temperature control medium to ensure that the desired temperature of the mold cavities is obtained at the desired portion of the mold cycle. The output of the thermocouple 76 can also be used to control the operation of the molding apparatus, such as the turning on the flow of the mold material into the mold cavities when the mold cavities are at the desired temperature and the opening of the molding apparatus when the molded article has reached the desired hardening temperature.

In the molding apparatus 10, the manifold plates 18 and 106 can be made of a material having a poorer heat conductivity than the material of the base plates 16 and 104. This means the major flow of heat will be between the mold cavities 26 and 114 and the temperature control medium in the grooves 36 and 124, respectively, rather than from the temperature control medium outwardly through the manifold plates. This will achieve a faster heating and cooling of the mold cavities 26 and 114. Also, it will allow the use of a temperature control medium for heating which is not as hot and a temperature control medium for cooling which is not as cold which will save energy and still achieve the desired temperature control of the mold cavities. Thus the manifold plates 18 and 106 not only provide the passages for feeding the temperature control medium to the grooves 36 and 124 but also provide for better heating or cooling of the mold cavities. Even though the manifold plates 18 and 106 may be of a different material, and therefore have a different coefficient of expansion than the base plates 16 and 104 and cover plates 20 and 108, this is compensated for by having the manifold plates 18 and 106 smaller than the recesses 28 and 116.

We claim:

1. Apparatus for injection molding an article comprising:
    a pair of mold members at least one of which is movable toward and away from the other, each of said mold members including
    a base plate having inner and outer surfaces with the inner surfaces of the base plates facing each other,
    mating mold cavities in the inner surfaces of the base plates,
    a channel in the outer surface of each of the base plates,
    a separate manifold plate mounted on the outer surface of each of the base plates, each of said manifold plates having inlet and outlet passages extending therethrough and connected to the channel in its respective base plate, and
    means holding each of the manifold plates against its respective base plate but allowing relative lateral movement between the manifold plates and the base plates.

2. Apparatus in accordance with claim 1 in which each of the base plates has an annular recess in its outer surface providing the base plate with a central cylindrical hub and an outer cylindrical rim, the channel is in the bottom surface of the recess, and each manifold plate is an annular plate which is seated in the recess in its respective base plate.

3. Apparatus in accordance with claim 2 in which the means holding each manifold plate to its respective base plate includes a cover plate extending across the outer surface of the base plate and the manifold plate and bolts extending through the cover plate and threaded into the rim of the base plate to secure the cover plate to the base plate.

4. Apparatus in accordance with claim 3 in which the means holding each manifold plate to the base plate also includes a nut threaded on the hub of each base plate and engaging the manifold plate.

5. Apparatus in accordance with claim 2 in which the channel in each base plate includes a plurality of radially spaced, circular grooves in the bottom surface of the recess in the base plate and radially extending grooves connecting adjacent circular grooves.

6. Apparatus in accordance with claim 5 in which the inlet and outlet passages in each manifold plate extend from the outer periphery of the manifold with the inlet passage extending to the radially innermost one of the circular grooves in the base plate and the outlet passage extending to the radially outermost one of the circular grooves.

7. Apparatus in accordance with claim 6 including separate inlet and outlet tubes connected to the inlet and outlet passages in the manifold plate with said tubes extending through passages in the rim of the base plate.

8. Apparatus in accordance with claim 6 including a pair of annular sealing rings between each manifold plate and the bottom surface of the recess in its respective base plate with one of the sealing rings being adjacent the inner periphery of the manifold plate and the other sealing ring being adjacent the outer periphery of the manifold plate.

9. Apparatus in accordance with claim 2 in which one of the base plates has a hole extending through its hub from the outer surface of the base plate to the mold cavity in the inner surface, said hole allowing for the flow of molding material into the mold cavity.

10. Apparatus in accordance with claim 1 in which one of the mold members has a thermocouple mounted therein and extending into the mold plate adjacent the mold cavity to measure the temperature of the mold cavity.

* * * * *